(12) United States Patent
Ogura et al.

(10) Patent No.: US 8,323,579 B2
(45) Date of Patent: Dec. 4, 2012

(54) S STORAGE CATALYST AND EXHAUST-GAS CONVERTING APPARATUS

(75) Inventors: Yoshitsugu Ogura, Toyota (JP); Takayuki Endo, Toyota (JP)

(73) Assignee: Toyota Jidosha Kabushiki Kaisha, Toyota-shi, Aich-ken (JP)

( * ) Notice: Subject to any disclaimer, the term of this patent is extended or adjusted under 35 U.S.C. 154(b) by 351 days.

(21) Appl. No.: 12/599,815

(22) PCT Filed: May 13, 2008

(86) PCT No.: PCT/JP2008/058776
§ 371 (c)(1), (2), (4) Date: Nov. 12, 2009

(87) PCT Pub. No.: WO2008/143062
PCT Pub. Date: Nov. 27, 2008

(65) Prior Publication Data
US 2010/0205947 A1    Aug. 19, 2010

(30) Foreign Application Priority Data
May 18, 2007    (JP) .................................. 2007-133156

(51) Int. Cl.
*B01D 50/00*    (2006.01)
(52) U.S. Cl. ...................................... 422/177
(58) Field of Classification Search ............... 422/177, 422/180
See application file for complete search history.

(56) References Cited

U.S. PATENT DOCUMENTS
2005/0164879 A1    7/2005    Chen

FOREIGN PATENT DOCUMENTS

| | | |
|---|---|---|
| EP | 1 949 959 | 7/2008 |
| JP | 9-881 | 1/1997 |
| JP | 10-202105 | 8/1998 |
| JP | 11-350945 | 12/1999 |
| JP | 2001-347139 | 12/2001 |
| JP | 2003-13728 | 1/2003 |
| JP | 2003154223 A * | 5/2003 |
| JP | 2004-218475 | 8/2004 |
| JP | 2006-75724 | 3/2006 |
| JP | 2006-144624 | 6/2006 |
| JP | 2006-205134 | 8/2006 |
| WO | WO 97/23278 | 7/1997 |

OTHER PUBLICATIONS

Notification of Reasons for Refusal for Appl. No. JP 2007-133156 dated Jul. 12, 2011.
Extended European Search Report for EP Appl. No. 08752656.2 dated Sep. 27, 2011.

* cited by examiner

*Primary Examiner* — Tom Duong
(74) *Attorney, Agent, or Firm* — Finnegan, Henderson, Farabow, Garrett & Dunner, LLP (57) ABSTRACT

An S storage catalyst 2 is equipped with a catalytic supporter, a catalytic metal being supported on this catalytic supporter and oxidizing $SO_2$ to $SO_3$, and an S storage material being supported on the catalytic supporter and storing S components therein. This S storage catalyst 2 has an exhaust-gas-inlet-side high-concentration portion 2A in which the S storage material is supported on the catalytic supporter in a high concentration, and an exhaust-gas-outlet-side low-concentration portion 2A in which the S storage material is supported on the catalytic supporter in a low concentration that is lower than that of the high-concentration portion. In accordance with this S storage catalyst 2, it is possible to maintain the S storing performance favorably, even in a case where exhaust-gas temperatures are low, while keeping the material cost from rising steeply.

4 Claims, 7 Drawing Sheets

Length of High-concentration Portion ("L1") / Overall Length ("L")

Fig.6

Fig.7

S STORAGE CATALYST AND EXHAUST-GAS CONVERTING APPARATUS

CROSS-REFERENCE TO RELATED APPLICATIONS

This application is a national phase application of International Application No. PCT/JP2008/058776, filed May 13, 2008, and claims the priority of Japanese Application No. 2007-133156, filed May 18, 2007, the contents of both of which are incorporated herein by reference.

TECHNICAL FIELD

The present invention relates to an S storage catalyst and an exhaust-gas converting apparatus; in particular, it relates to an S storage catalyst and an exhaust-gas converting apparatus that can be utilized suitably when converting exhaust gases that are emitted from lean-burn engines.

BACKGROUND ART

Heretofore, as a catalyst for converting automotive exhaust gas, three-way catalysts have been used, three-way catalysts which convert exhaust gases by carrying out the oxidation of carbon monoxide (CO) and hydrocarbons (HC) in the exhaust gases and the reduction of nitrogen oxides ($NO_x$) in them simultaneously under the driving condition of theoretical air-fuel ratio (or being stoichiometric). As for such a three-way catalyst, the following have been known widely: those in which a porous support layer comprising γ-alumina, and the like, is formed on a heat-resistant substrate comprising cordierite, and so forth, and then a catalytic metal, such as platinum (Pt) or rhodium (Rh), is supported on the resulting porous support layer, for instance.

Meanwhile, from the viewpoint of global environmental protection, carbon dioxide ($CO_2$) in exhaust gases that are emitted from internal combustion engines for automobile, and the like, has been considered a problem recently, and the so-called "lean-burn" in which they undergo lean burning in oxygen-rich atmosphere is regarded promising as a measure for solving it. In this lean-burn, it is possible to suppress the occurrence of $CO_2$, namely, its combusted exhaust gas, because it is possible to reduce the consumption amount of fuel.

By the way, the performance of exhaust-gas converting catalyst depends greatly on the set-up air-fuel ratio (A/F) of engine. Specifically, on the lean side where the air-fuel ratio is great, the oxidation action becomes active and the reduction action becomes inactive because the oxygen amount in after-combustion exhaust gas becomes abundant. Accordingly, in conventional three-way catalysts which can convert CO, HC and $NO_x$ in exhaust gas efficiently at the theoretical air-fuel ratio (or at stoichiometry), no sufficient converting performance is exhibited with respect to the removal of $NO_x$ by means of reduction in lean atmosphere that turns into being oxygen rich. Consequently, an exhaust-gas converting catalyst for lean-burn engine has been desired, exhaust-gas converting catalyst which can convert NO efficiently even in oxygen-rich atmosphere.

As for such an exhaust-gas converting catalyst for lean-burn engine, an $NO_x$ storage-and-reduction type catalyst has been put into practical use, $NO_x$ storage-and-reduction type catalyst in which an $NO_x$ storage material comprising an alkaline-earth metal such as barium (Ba), and the like, and a noble metal such as Pt are supported on a porous supporter. This $NO_x$ storage-and-reduction type catalyst for lean-burn differs from the three-way catalysts in that, even when being oxygen-rich exhaust gases, it stores and then reduces $NO_x$ efficiently to convert them.

However, $SO_2$ is included in exhaust gases, $SO_2$ which generates because sulfur (S) being included in fuels is combusted. This $SO_2$ is turned into $SO_3$ by being oxidized by means of noble metal in high-temperature exhaust gases. And, this $SO_3$ turns into sulfuric acid due to water vapor being included in the exhaust gases. When $SO_3$ and sulfuric acid thus generate in the exhaust gases, sulfites and sulfates are generated by means of the reactions between the resulting $SO_3$ or sulfuric acid and the $NO_x$ storage material, and then it became apparent that the $NO_x$ storage material is poisoned by means of this. When the $NO_x$ storage material is thus deteriorated by means of S poisoning, the after-durability $NO_x$ converting performance has lowered because it is no longer able to store $NO_x$.

Hence, an exhaust-gas converting apparatus has been known, exhaust-gas converting apparatus in which an S storage catalyst, which stores S components from exhaust gases, is disposed at the previous stage to an $NO_x$ storage-and-reduction type catalyst (See Patent Literature No. 1, for instance).

The S storage catalyst in this exhaust-gas converting apparatus is completed by supporting an S storage material, which comprises an alkali metal, such as potassium or sodium, or an alkaline-earth metal, such as calcium or barium, and a catalytic noble metal, such as platinum or palladium, onto a supporter, which comprises alumina. In accordance with such an S storage catalyst, since it is possible to store S components in exhaust gases, it is possible to suppress the S poisoning of the $NO_x$ storage-and-reduction type catalyst by disposing this S storage catalyst at the previous stage to the $NO_x$ storage-and-reduction type catalyst.

Patent Literature No. 1: Japanese Unexamined Patent Publication (KOKAI) Gazette No. 2006-144,624

DISCLOSURE OF THE INVENTION

Assignment to be Solved by the Invention

However, when an exhaust-gas temperature becomes so low as 250° C. or less approximately, the conversion reaction from $SO_2$ to $SO_3$ by means of the catalytic noble metal becomes insufficient. $SO_2$ exhibits lower acidity than $SO_3$ does. Meanwhile, the S storage material, which comprises an alkali metal or an alkaline-earth metal, is less likely to store $SO_2$ whose acidity is lower than that of $SO_3$. Accordingly, in a case where an inlet-gas temperature to the S storage catalyst is low, the S storing performance resulting from the S storage catalyst lowers, and consequently many $SO_2$ have passed through the S storage catalyst as they are. If such is the case, it is not possible to suppress the S poisoning of the $NO_x$ storage-and-reduction type catalyst effectively; as a result, the after-durability $NO_x$ converting performance has lowered.

If the catalytic noble metal should have been supported onto the S storage catalyst excessively, the lowering of $SO_3$ conversion rate at the time of low temperature is kept down, and accordingly it is possible to resolve the aforementioned problems. However, this way has incurred a steep rise in the material cost because the catalytic noble metal is highly expensive.

The present invention is one which has been done in view of the aforementioned circumstances, and it is an object to provide an S storage catalyst, which can maintain the S storing performance satisfactorily even in a case where exhaust-gas temperatures are low, while keeping down the steep rise in the material cost.

Means for Solving the Assignment

An S storage catalyst according to the present invention, which solves the aforementioned assignment, is characterized in that it is equipped with: a catalytic supporter; a catalytic metal being supported on the catalytic supporter and oxidizing $SO_2$ to $SO_3$; and an S storage material being supported on the catalytic supporter and storing S components therein; and in that it has:

an exhaust-gas-inlet-side high-concentration portion in which said S storage material is supported on said catalytic supporter in a high concentration; and an exhaust-gas-outlet-side low-concentration portion in which said S storage material is supported on said catalytic supporter in a low concentration that is lower than that of the high-concentration portion.

In the S storage catalyst according to the present invention, the basicity of the S storage material is intense to such an extent that it has become a higher concentration at the high-concentration portion on which the S storage material is supported in a high concentration. When the basicity of the S storage material is intenser, it is possible to favorably store even $SO_2$ whose acidity is lower than that of $SO_3$. When being $SO_2$ that has been stored in the S storage material, it can be oxidized by means of the catalytic metal while taking time. And, when being $SO_3$ that has been oxidized by means of the catalytic metal and whose acidity is high, it is possible to have the S storage material at the low-concentration portion store it securely.

Accordingly, it has the high-concentration portion, on which the S storage material is supported in a high concentration, on the exhaust-gas inlet side; and it has the low-concentration portion, on which the S storage material is supported in a low concentration, on the exhaust-gas outlet side. In accordance with the S storage catalyst according to the present invention, not only it is possible to store $SO_2$ in exhaust gases securely with the S storage material of the high-concentration portion, but also it is possible to oxidize the stored $SO_2$ to $SO_3$ with the catalytic metal while taking time and then store the resulting $SO_3$ securely with the S storage material of the low-concentration portion. Consequently, even at the time of low temperatures where the ratio of conversion from $SO_2$ to $SO_3$ by means of the catalytic metal becomes low, it becomes feasible to maintain the S storing performance favorably.

Moreover, in the S storage catalyst according to the present invention, the material cost does not rise steeply, either, because it is not necessary to support the catalytic metal excessively in order to keep the $SO_3$ conversion rate from lowering at the time of low temperatures.

In the S storage catalyst according to the present invention, it is preferable that said catalytic metal can be supported on said high-concentration portion in a high concentration; and said catalytic metal can be supported on said low-concentration portion in a low concentration that is lower than that of the high-concentration portion.

In accordance with this construction, it is possible to oxidize the $SO_2$, which has been stored in the S storage material of the high-concentration portion, to $SO_3$ more efficiently with the catalytic metal, because not only the S storage material but also the catalytic metal are supported on the high-concentration portion in a high concentration, respectively. Moreover, since the catalytic metal is supported on the low-concentration portion, though, in a low concentration, if there should have been $SO_2$ that has passed through the high-concentration portion as it is, it is possible to oxidize that $SO_2$ to $SO_3$ with the catalytic metal of the low-concentration portion. Besides, since the catalytic metal is supported on the low-concentration portion in a low concentration, it is possible to keep the material cost from rising steeply, compared with a case of supporting the catalytic metal over the entire S storage catalyst in a high concentration.

In the S storage catalyst according to the present invention, it is preferable that, when an overall length of the S storage catalyst in an exhaust-gas flowing direction is labeled "L" and a length of said high-concentration portion in the exhaust-gas flowing direction is labeled "L1," they can satisfy a relationship, "L"/15≦"L1"<"L"/3. When the relationship between the overall length "L" of the S storage catalyst and the length "L1" of the high-concentration portion satisfies "L"/15≦"L1"<"L"/3, it is possible to maintain the S storing performance at the S storage catalyst highly securely, as being exhibited by later-described examples.

In the S storage catalyst according to the present invention, it is preferable that a supporting amount of said S storage material at said high-concentration portion can be 0.2-0.4 mol/liter. When the supporting amount of the S storage material at the high-concentration portion is 0.2-0.4 mol/liter, it is possible to maintain the S storing performance at the S storage catalyst highly securely, as being exhibited by later-described examples.

In the S storage catalyst according to the present invention, it is preferable that a supporting amount of said catalytic metal at said high-concentration portion can be 3.5 g/liter or more. When the supporting amount of the catalytic metal at the high-concentration portion is 3.5 g/liter or more, it is possible to maintain the S storing performance at the S storage catalyst highly securely, as being exhibited by later-described examples.

An exhaust-gas converting apparatus according to the present invention is one which is characterized in that it is equipped with: the S storage catalyst according to the present invention; and an $NO_x$ storage-and-reduction type catalyst being disposed on a more exhaust-gas downstream side than the S storage catalyst is.

In accordance with the exhaust-gas converting apparatus according to the present invention, it is possible to maintain the S storing performance at the S storage catalyst, which is disposed at the previous stage to the $NO_x$ storage-and-reduction type catalyst, favorably even in the case where exhaust-gas temperatures are low, and therefore it becomes feasible to suppress the S poisoning of the $NO_x$ storage-and-reduction type catalyst favorably.

Effect of the Invention

Hence, in accordance with the S storage catalyst according to the present invention, while keeping the material cost from rising steeply, the S storing performance can be maintained favorably even in the case where exhaust-gas temperatures are low. Moreover, in accordance with the exhaust-gas converting apparatus according to the present invention, while keeping the material cost from rising steeply, the S poisoning of the $NO_x$ storage-and-reduction type catalyst can be suppressed favorably even in the case where exhaust-gas temperatures are low.

Therefore, it is feasible for the exhaust-gas converting apparatus according to the present invention to store, reduce and then purify $NO_x$ in exhaust gases, which are emitted from lean-burn engines, efficiently over a long period of time.

EXPLANATION ON REFERENCE NUMERALS

2 S Storage Catalyst;
3 $NO_x$ Storage-and-Reduction Type Catalyst;
10 Exhaust-gas Converting Apparatus;
2A High-concentration Portion; and
2B Low-concentration Portion

BEST MODE FOR CARRYING OUT THE INVENTION

Hereinafter, embodying modes according to the present invention will be explained.

An S storage catalyst according to a specific embodying mode is equipped with a catalytic supporter, a catalytic metal being supported on the catalytic supporter and oxidizing $SO_2$ to $SO_3$, and an S storage material being supported on the catalytic supporter and storing S components therein.

As a quality of material for the catalytic supporter, it is not limited especially as far as being those exhibiting predetermined heat resistance and rigidity, and the like; and it can be adapted into being ceramics, such as cordierite and SiC, or metals, for instance. Moreover, a configuration of the catalytic supporter is not limited especially, either; and it can be adapted into being straight-flow types, filter types, or the other configurations, for instance.

The catalytic metal oxidizes $SO_2$ in exhaust gases, and $SO_2$ being stored in the S storage material, to $SO_3$. As for this catalytic metal, it can be adapted into being at least one member that is selected from the group consisting of noble metals such as platinum (Pt), palladium (Pd), rhodium (Rh) and silver (Ag), and iron (Fe), and the like, for instance. However, from the viewpoint of enhancing the reactivity from $SO_2$ to $SO_3$, it is preferable that at least platinum can be included.

The S storage material stores S components in exhaust gases (i.e., sulfur components, and $SO_x$ such as $SO_2$ and $SO_3$, and the like) therein. As for this S storage material, it can be adapted into being at least one member that is selected from the group consisting of alkali metals, such as lithium (Li), sodium (Na) and potassium (K); and alkaline-earth metals, such as magnesium (Mg), calcium (Ca), strontium (Sr) and barium (Ba). However, from the viewpoint of enhancing the S strong performance, it is preferable that at least one member that is selected from the group consisting of Ba, Mg and K can be included.

A method of supporting the catalytic metal and S storage material with respect to the catalytic supporter is not limited especially, and accordingly it is possible to employ the same methods as those having been used conventionally. For example, porous ceramic with large specific surface area can be coated onto the catalytic supporter, and then the catalytic metal and S storage material can be supported onto this coating layer. Note that, as for a material for the coating layer, it can be adapted into being at least one member that is selected from the group consisting of alumina ($Al_2O_3$), ceria ($CeO_2$), zirconia ($ZrO_2$), titania ($TiO_2$) and zeolite, and the like, for instance. Among these, alumina whose specific surface area is high, and zirconia whose basicity is high are especially preferable. Moreover, it is preferable to set the coating amount to 30 g/L-cat. or more, and it is more preferable to set it to 100 g/L-cat. or more.

And, the S storage catalyst, which is directed to the present embodying mode, has an exhaust-gas-inlet-side high-concentration portion, and an exhaust-gas-outlet-side low-concentration portion.

At the high-concentration portion, the S storage material is supported on the catalytic supporter in a high concentration. Accordingly, at the high-concentration portion, the basicity of the S storage material becomes intense. Consequently, it is possible to store $SO_2$, whose acidity is lower than that of $SO_3$, favorably with the S storage material of the high-concentration portion. The S storage material at this high-concentration portion has such a major function as storing $SO_2$ in exhaust gases.

At the low-concentration portion, the S storage material is supported on the catalytic supporter in a lower concentration than that of the high-concentration portion. Accordingly, the S storage material at this low-concentration portion has such a major function as storing $SO_3$ that has been generated because $SO_2$, which has been stored in the S storage material of the high-concentration portion, is oxidized by means of the catalytic metal while taking time.

Here, it is allowable that the catalytic metal can be supported on the entirety of the S storage material in a uniform concentration, and it is also allowable that it can be supported on the high-concentration portion alone; alternatively it is allowable that it can be supported on the high-concentration portion, and on the low-concentration portion, in differing concentrations, respectively. However, from the viewpoint of enhancing the S storing performance of the S storage catalyst, it is preferable that the catalytic metal can be supported on the high-concentration portion in a higher concentration and can be supported on the low-concentration portion in a lower concentration than that of the high-concentration portion. By means of this, it is possible to oxidize $SO_2$, which has been stored in the S storage material of the high-concentration portion, to $SO_3$ more efficiently with the catalytic metal that is supported in a higher concentration. Moreover, even if there should have been $SO_2$ that has passed through as it is without being stored in the S storage material of the high-concentration portion, it is possible as well to oxide that $SO_2$ to $SO_3$ with the catalytic metal of the low-concentration portion.

In order to enhance the S storing performance in the S storage catalyst, it is preferable to set up the following appropriately: a proportion that the high-concentration portion occupies in the entirety of the S storage catalyst; a supporting amount of the S storage amount at the high-concentration portion; and a supporting amount of the catalytic metal at the high-concentration portion.

Specifically, it is preferable that, when an overall length of the S storage catalyst in an exhaust-gas flowing direction is labeled "L" and a length of the high-concentration portion in the exhaust-gas flowing direction is labeled "L1," they can satisfy a relationship, "L"/15≦"L1"<"L"/3. When the length "L1" of the high-concentration portion becomes shorter than "L"/15, the S storing performance lowers because the adsorbing capacity of $SO_2$ and the $SO_3$ converting capacity become lower. On the other hand, when the length "L1" of the high-concentration portion becomes longer than "L"/3, the S storing performance lowers because the $SO_3$ adsorbing sites decrease, though the adsorbing capacity of $SO_2$ and the $SO_3$ converting capacity become higher.

Moreover, it is preferable that a supporting amount of the S storage material at the high-concentration portion can be 0.2-0.4 mol/liter. When the supporting amount of the S storage material at the high-concentration portion becomes less than 0.2 mol/liter, the S storing performance lowers because the adsorption amount of $SO_2$ at the high-concentration portion becomes less. On the other hand, when the supporting amount of the S storage material at the high-concentration portion surpasses 0.4 mol/liter, the S storing performance lowers because a supporting amount of the S storage catalyst at the low-concentration portion becomes extremely less, in a case where a supporting amount of the S storage material in the entirety of the S storage material is kept from augmenting excessively.

In addition, it is preferable that a supporting amount of the catalytic metal at the high-concentration portion can be 3.5 g/liter or more, can more preferably be 4.0 g/liter or more, and can especially preferably be 5.0 g/liter or more. When the supporting amount of the catalytic metal at the high-concentration portion becomes less than 3.5 g/liter, the S storing performance lowers because the $SO_2$ oxidizing capacity at the high-concentration portion becomes lower. Note that, even when making the supporting amount of the catalytic metal at the high-concentration portion greater more than necessary, it has only brought about a steep rise in cost. Because of this, it is preferable to set the upper limit of the supporting amount of the catalytic metal at the high-concentration portion at 10.0 g/liter, more preferably at 5.0 g/liter, from the viewpoint of keeping cost from rising steeply.

Note that, in the S storage catalyst according to the present embodying mode, it is allowable to compound other components if needed.

In accordance with the S storage catalyst according to the present embodying mode that has such a construction, not only it is possible to store $SO_2$ in exhaust gases with the S storage material of the high-concentration portion securely, but also it is possible to oxidize the stored $SO_2$ to $SO_3$ with the catalytic metal while taking time and then store the resulting $SO_3$ with the S storage material of the low-concentration portion securely, without ever supporting the catalytic metal excessively in order for keeping the $SO_3$ conversion rate at the time of low temperatures from lowering. Therefore, while keeping cost from rising steeply, it becomes feasible to maintain the S storing performance favorably even at the time of low temperatures where the conversion rate from $SO_2$ to $SO_3$ by means of the catalytic metal becomes lower.

Moreover, an exhaust-gas converting apparatus according to the present embodying mode is equipped with the S storage catalyst according to the present embodying mode, and an $NO_x$ storage-and-reduction type catalyst that is disposed on a more exhaust-gas downstream side than this S storage catalyst is. In accordance with this exhaust-gas converting apparatus, it becomes feasible to suppress the S poisoning of the $NO_x$ storage-and-reduction type catalyst favorably because it is possible to maintain the S storing performance at the S storage catalyst that is disposed at the forward stage to the $NO_x$ storage-and-reduction type catalyst, even in a case where exhaust-gas temperatures are low.

As for the $NO_x$ storage-and-reduction type catalyst, it is not limited especially, and accordingly it is possible to employ those which are the same as the conventional ones. For example, it is possible to adapt it into a construction that includes: a supporter comprising a porous oxide; a noble metal being supported on this supporter; and an $NO_x$ storage material that is at least one member, which is selected from the group consisting of alkali metals, alkaline-earth metals and rare-earth elements that are supported on this supporter.

As for a porous oxide that is usable for the supporter, it is possible to name alumina, zeolite, silica ($SiO_2$), zirconia ($ZrO_2$), or titania ($TiO_2$).

The noble metal to be supported onto the supporter not only oxides CO and HC in exhaust gases mainly, but also fulfils a role of oxidizing NO being a major component of $NO_x$ in exhaust gases to $NO_2$ and then making it likely to be stored in the $NO_x$ storage material. As for a type of such a noble metal, it is possible to name Pt, Rh, Pd, Ir, or Ru, and the like.

The $NO_x$ storage material to be supported onto the supporter fulfils a role of storing NO in fuel-lean atmosphere, and a role of emitting $NO_x$ in from fuel-stoichiometric to fuel-rich atmosphere. As for such an $NO_x$ storage material, it is possible to use at least one member or more that are selected from the group consisting of alkali metals, alkaline-earth metals and rare-earth elements, for instance. As for the alkali metals, it is possible to name Li, Na and K; as for the alkaline-earth metals, it is possible to name Mg, Ca and Ba; as for the rare-earth element, it is possible to name Sc, Y, La, Ce, Pr and Nd, and the like, respectively.

It is allowable that the S storage catalyst and the $NO_x$ storage-and-reduction type catalyst can be incorporated into one catalytic converter; alternatively, it is also allowable that they can be incorporated into distinct catalytic converters, respectively, and then the resulting two converters can be put in place in series in an exhaust-gas flow passage.

Therefore, the S storage catalyst and exhaust-gas converting apparatus according to the present embodying mode can be utilized suitably for converting exhaust gases that are discharged from lean-burn engines.

EXAMPLES

Based on the above-described embodying mode, an exhaust-gas converting apparatus for lean-burn engine, one of the forms of the S storage catalyst and exhaust-gas converting apparatus according to the present invention, was made as an example.

Example No. 1

Figure 1:
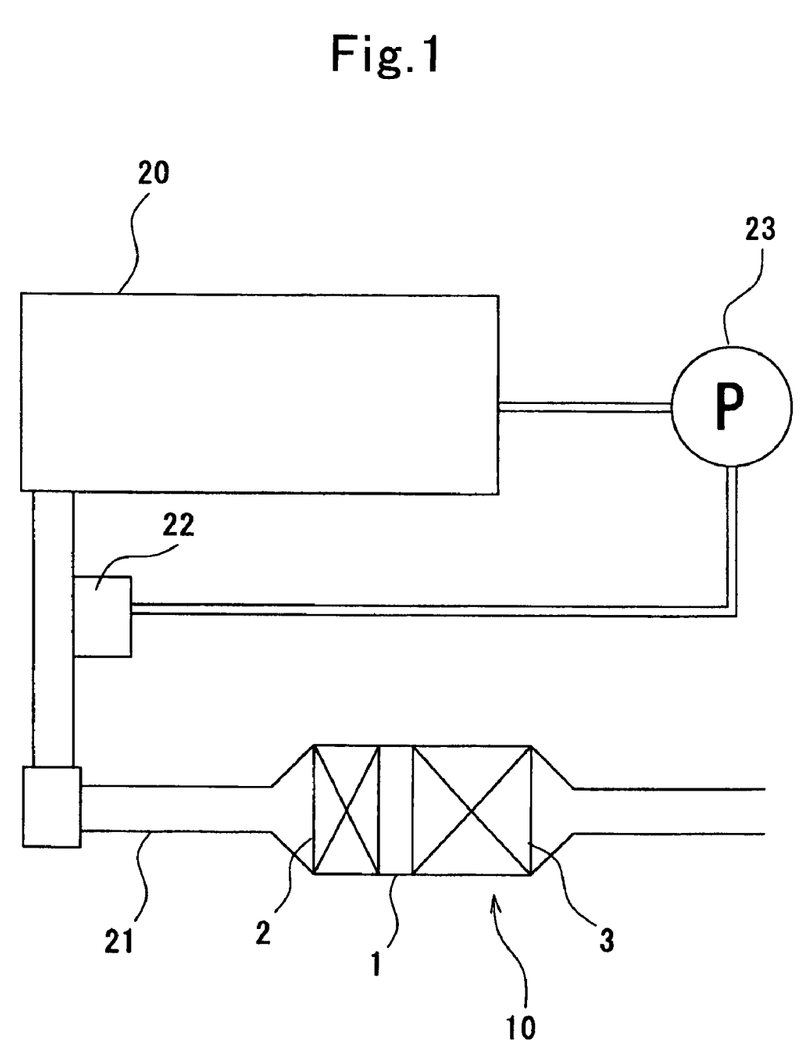
FIG. 1 is a schematic diagram for explaining an overall construction of an exhaust-gas converting system to which an S storage catalyst and exhaust-gas converting apparatus according to a specific example are applied.

FIG. 1 is an exhaust-gas converting system into which an exhaust-gas converting apparatus 10 according to the present example is incorporated. In this exhaust-gas converting system, not only a fuel adding system 22 is incorporated into an exhaust flow passage 21 into which exhaust gases from an engine 20 flow, but also the exhaust-gas converting apparatus 10 is incorporated into the exhaust flow passage 21 that is more adjacent to the downstream side than this fuel adding system 21 is.

The fuel adding system 22 adds a fuel, which serve as a reducing agent for generating reducing components, such as HC and CO, into exhaust gases that flow through the exhaust flow passage 21. The fuel from the engine 20 is adapted into being supplied into this fuel adding system 22 by way of a fuel pump 23.

The exhaust-gas converting apparatus 10 is constituted of a catalytic converter 1, an S storage catalyst 2 that is disposed on an exhaust-gas upstream side within this catalytic converter 1, and an $NO_x$ storage-and-reduction type catalyst 3 that is disposed on an exhaust-gas downstream side within this catalytic converter 1.

The S storage catalyst 2 is constituted of a catalytic supporter that is completed by coating a coating layer onto a straight-flow-type substrate being made form cordierite, platinum (Pt) that serves as a catalytic metal being supported on this catalytic supporter, and barium (Ba) that serves as an S storage material being supported on this catalytic supporter.

Here, the coating layer included γ-alumina and zirconia, and the coating amount was set at 150 g/L-cat. The Pt supporting amount as per the entirety of the S storage catalyst 2 was set at 2.0 g/L-cat., and the Ba supporting amount as per the entirety of the S storage catalyst 2 was set likewise at 0.1 mol/L-cat.

Figure 2:
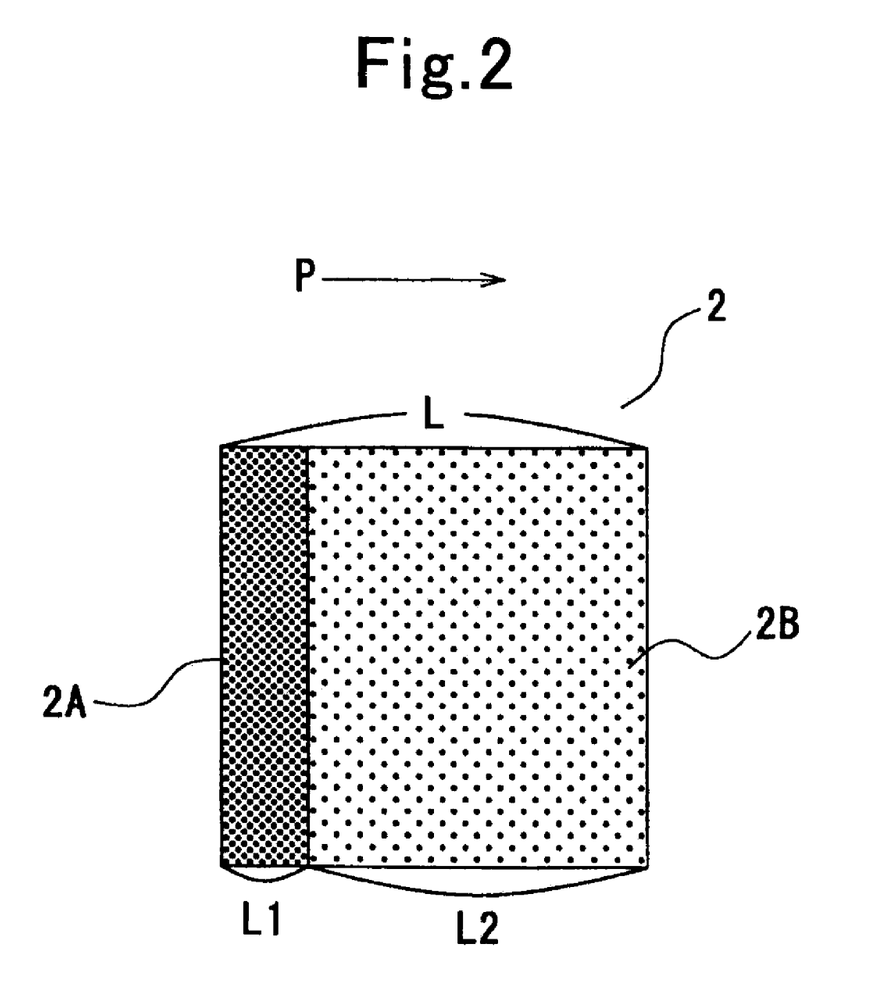
FIG. 2 is a schematic diagram for explaining a construction of an S storage catalyst according to a specific example.

And, the S storage catalyst 2 according to the present example has a high-concentration portion 2A on the exhaust-gas inlet side, and a low-concentration portion 2B on the exhaust-gas outlet side, as schematically illustrated in FIG. 2. At the high-concentration portion 2A, Ba, which serves as an S storage material, and Pt, which serves as a catalytic metal, are supported on the catalytic supporter in a high concentration, respectively. Moreover, at the low-concentration portion 2B, Ba, which serves as an S storage material, and Pt, which serves as a catalytic metal, are supported on the catalytic supporter in a low concentration, respectively.

To be concrete, at the high-concentration portion 2A, the Ba supporting amount was set at 0.3 mol/L-cat., and the Pt supporting amount was set at 5.0 g/L-cat. Moreover, at the low-concentration portion 2B, the Ba supporting amount was set at 0.05 mol/L-cat., and the Pt supporting amount was set at 1.25 g/L-cat.

Moreover, the high-concentration portion 2A's length of "L1" in the exhaust-gas flowing direction (in the direction of the arrow "P" in FIG. 2) was set at 10 mm, and the low-concentration portion 2B's length of "L2" in the exhaust-gas flowing direction was set at 40 mm. Therefore, the relationship between the overall length "L" (=50 mm) of the S storage catalyst and the length "L1" of the high-concentration portion was set at "L1"="L"/5.

The S storage catalyst 2 according to the present example was manufactured as follows.

First of all, a mixture powder of γ-alumina and zirconia (the mixing ratio was γ-alumina:zirconia=1:2 by mass ratio) was turned into a slurry by a predetermined method, and the resulting slurry was coated onto a substrate with a predetermined configuration that was made from cordierite, thereby making a supporter precursor. Then, the resulting supporter precursor was calcined after being dried, thereby making it into a catalytic supporter.

Thereafter, a predetermined part on one of the opposite ends of the resulting catalytic supporter was immersed into a barium acetate aqueous solution with a predetermined high concentration, and was calcined after being dried. Moreover, the predetermined part on the one of the opposite ends of the catalytic supporter was immersed into a dintro diamine platinum nitrate aqueous solution with a predetermined high concentration, and was calcined after being dried. Thus, the high-concentration portion 2B on which Ba and Pt were supported in high concentrations was formed on the one of the opposite ends of the catalytic supporter.

Subsequently, the remaining part on the other one of the opposite ends of the catalytic supporter was immersed into a barium acetate aqueous solution with a predetermined low concentration, and was calcined after being dried. Moreover, the remaining part on the other one of the opposite ends of the catalytic supporter was immersed into a dintro diamine platinum nitrate aqueous solution with a predetermined low concentration, and was calcined after being dried. Thus, the low-concentration portion 2B on which Ba and Pt were supported in low concentrations was formed on the other one of the opposite ends of the catalytic supporter, thereby completing the S storage catalyst 2 according to the present example.

Moreover, the $NO_x$ storage-and-reduction type catalyst 3 is completed by supporting Ba and K, which serve as $NO_x$ storage materials, and Pt, which serves as a catalytic metal, onto a porous supporter, which comprises $Al_2O_3$. The supporting amount of the $NO_x$ storage materials was set at 0.1 mol/L-cat. for Ba, and at 0.1 mol/L-cat. for K; and the supporting amount of Pt was set at 3.0 g/L-cat.

Example No. 2

It was adapted into the same S storage catalyst 2 as that of Example No. 1 except the following: Pt was supported onto the high-concentration portion 2A alone, thereby setting the Pt supporting amount at the high-concentration portion 2A at 10 g/L-cat., and setting the Pt supporting amount at the low-concentration portion 2B at 0 g/L-cat.

Note that the high-concentration portion 2A's length "L1" was set at 10 mm in the same manner as in Example No. 1. Moreover, the Pt supporting amount as per the entirety of the S storage catalyst 2, and the Ba supporting amount as per the entirety of the S storage catalyst 2 were set at 2.0 g/L-cat., and 0.1 mol/L-cat., respectively, in the same manner as Example No. 1.

Example No. 3

It was adapted into the same S storage catalyst 2 as that of Example No. 1 except that Pt was supported onto the entirety of the S storage catalyst 2 in a uniform concentration (i.e., 2.0 g/L-cat).

Note that the high-concentration portion 2A's length "L1" was set at 10 mm in the same manner as in Example No. 1. Moreover, the Pt supporting amount as per the entirety of the S storage catalyst 2, and the Ba supporting amount as per the entirety of the S storage catalyst 2 were set at 2.0 g/L-cat., and 0.1 mol/L-cat., respectively, in the same manner as Example No. 1.

Comparative Example

It was adapted into the same S storage catalyst 2 as that of Example No. 1 except that Pt and Ba were supported onto the entirety of the S storage catalyst 2 in a uniform concentration, respectively. Note that the Pt supporting amount as per the entirety of the S storage catalyst 2, and Ba supporting amount as per the entirety of the S storage catalyst 2 were set at 2.0 g/L-cat., and 0.1 mol/L-cat., respectively, in the same manner as Example No. 1.

Performance Evaluation on Example Nos. 1-3 and Comparative Example

In order to evaluate the S storing performance, testing samples, which were directed to the S storage catalysts according to Example Nos. 1-3 and Comparative Example, were made ready in the same manner as Example Nos. 1-3 and Comparative Example, respectively, except that they were made to a test-piece size with φ30 mm×L50 mm.

And, regarding each of the testing samples, the conversion rate from $SO_2$ to $SO_3$ was examined. This test of conversion from $SO_2$ to $SO_3$ was carried out by means of flowing $SO_2$ into a 250-° C. and stationary lean-atmosphere model gas that simulated a lean exhaust gas, and then placing the testing samples in this. Note that the testing time was set at 180 minutes. Moreover, the gaseous composition of the testing atmosphere was set so that $SO_2$ was 100 ppm, NO was 200 ppm, $C_3H_6$ was 200 ppm, $O_2$ was 10%, $CO_2$ was 10%, $H_2O$ was 5%, and the balance was $N_2$; and the flow volume was set at 50 liter/min.

Moreover, regarding each of the testing samples, the S storing performance was examined.

As shown in Table 1 in which these results are given, in all of the S storage catalysts that are directed to Example Nos. 1-3, both of the conversion rate from $SO_2$ to $SO_3$ and S storing performance were superior to those of the S storage catalyst that is directed to Comparative Example.

TABLE 1

|  | Conversion Rate from $SO_2$ to $SO_3$ (%) | S Storing Performance (g/L-cat.) |
|---|---|---|
| Ex. No. 1 | 71 | 28 |
| Ex. No. 2 | 71 | 28 |
| Ex. No. 3 | 32 | 28 |
| Comp. Ex. | 15 | 15 |

(Relationship Between Pt Supporting Amount and Ba Supporting Amount and Conversion Rate from $SO_2$ to $SO_3$)

S-storage-catalyst testing samples were made ready in the same manner as Example No. 1 except the following: they were made to a test-piece size with φ30 mm×L50 mm; and Pt and Ba were supported onto the entire catalysts in uniform concentrations, respectively.

And, regarding each of the testing samples, the same test of conversion from $SO_2$ to $SO_3$ as that being described above was carried out, thereby examining the conversion rate from $SO_2$ to $SO_3$.

Figure 3:
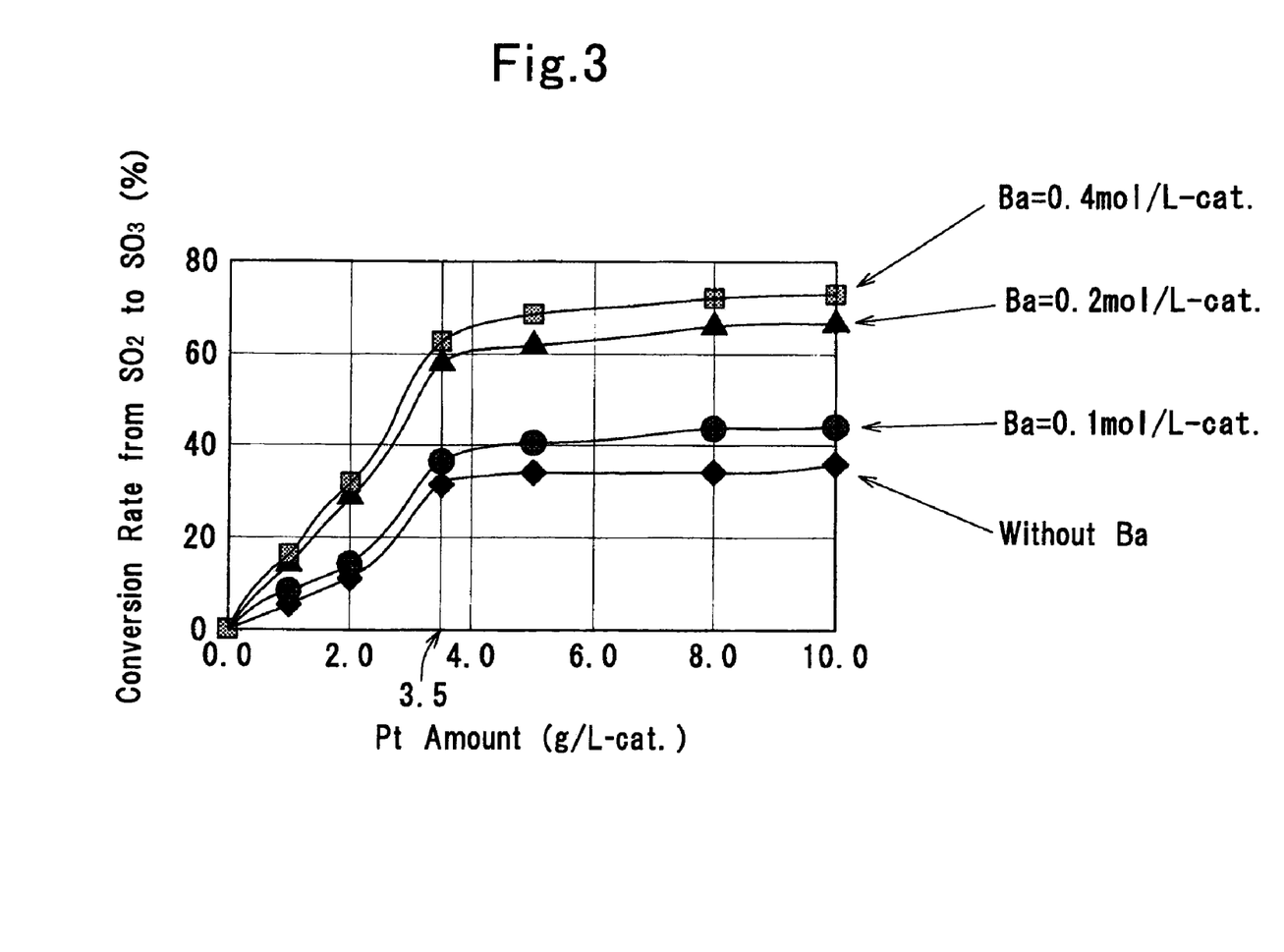
FIG. 3 is a graph for illustrating relationships between Pt supporting amounts, Ba supporting amounts and conversion rates from $SO_2$ to $SO_3$.

As can be understood from FIG. 3 in which those results are illustrated, it is preferable that the Pt supporting amount on the entire S storage catalyst can be 3.5 g/L-cat. or more. By means of combining Pt with Ba, the conversion rate from $SO_2$ to $SO_3$ improves, and it is preferable that the Ba supporting amount can be 2 mol/L-cat. or more when combining Pt with Ba.

These facts show that high-concentration Ba is effective at the time of low temperatures where the conversion from $SO_2$ to $SO_3$ is difficult. That is, it is possible to secure the time for the conversion from $SO_2$ to $SO_2$ sufficiently by directly adsorbing $SO_2$ by means of high-concentration Ba, and thereby the $SO_3$ conversion rate improves. Moreover, where the Ba supporting amount is less than 0.2 mol/L-cat., since the direct adsorption of $SO_2$ becomes insufficient, the $SO_3$ conversion rate lowers, compared with the case where the Ba supporting amount is 0.2 mol/L-cat. or more. On the other hand, where the Ba supporting amount is 0.2 mol/L-cat. or more, since the conversion rate from $SO_2$ to $SO_3$ lowers when the Pt supporting amount becomes less than 3.5 g/L-cat., the $SO_3$ conversion rate lowers.

(Relationship Between High-Concentration Portion's Length "L1" and Conversion Rate from $SO_2$ to $SO_3$ and S Storing Performance)

S-storage-catalyst testing samples were made ready in the same manner as Example No. 1 except the following: they were made to a test-piece size with φ30 mm×L50 mm; and the ratio of the high-concentration portion 2A's length "L1" to the S storage catalyst's overall length "L" was changed variously to 0, 1/15, 2/15, 1/5, 4/15, 1/3, and 2/5.

Note that the Pt supporting amount at the high-concentration portion 2A was fixed at 5.0 g/L-cat. and the Pt supporting amount as per the entire catalyst was fixed at 2.0 g/L-cat. Moreover, the Ba supporting amount at the high-concentration portion 2A was fixed at 0.3 mol/L-cat. and the Ba supporting amount as per the entire catalyst was fixed at 0.1 mol/L-cat. Consequently, as the high-concentration portion 2A's length "L1" becomes longer, the Pt supporting amount and Ba supporting amount at the low-concentration portion 2B decrease.

Moreover, one whose high-concentration portion 2A's length "L1" was set at 0 is one which corresponds to said Comparative Example.

And, regarding each of the testing samples, the same test as described above was carried out, thereby examining the conversion rate from $SO_2$ to $SO_3$ and S storing performance.

Figure 4:
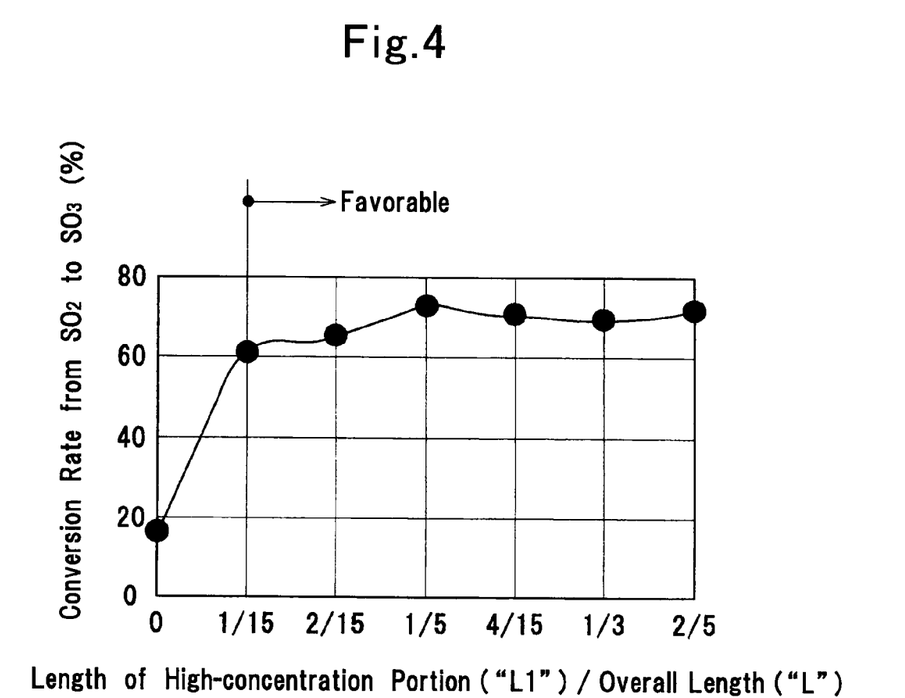
FIG. 4 is a graph for illustrating a relationship between high-concentration portion's lengths (L1) and conversion rates from $SO_2$ to $SO_3$.
Figure 5:
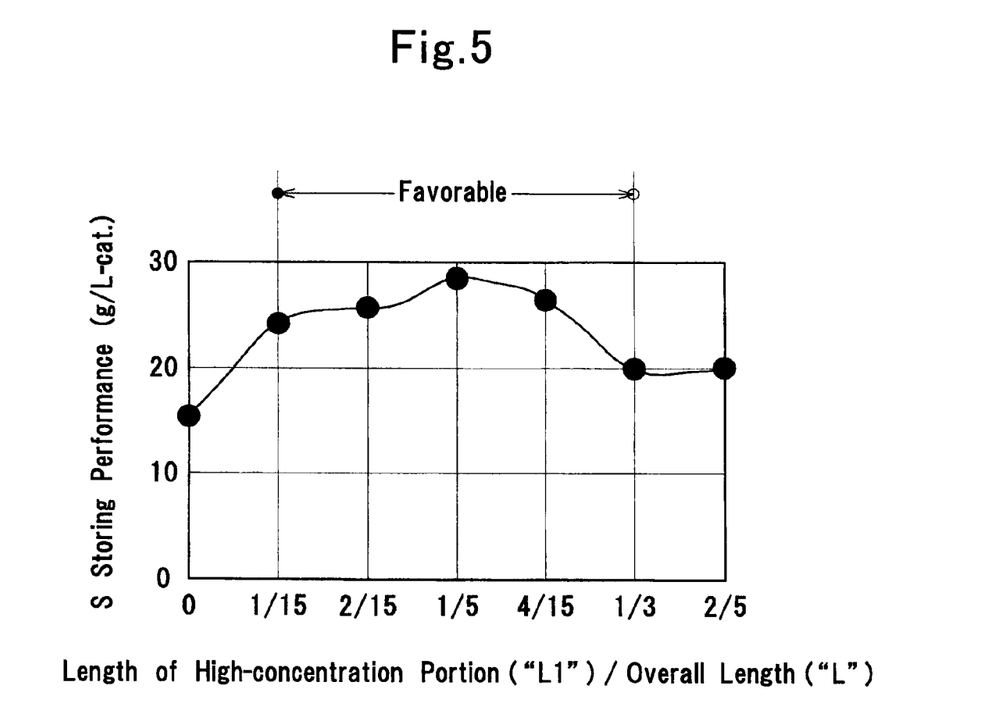
FIG. 5 is a graph for illustrating a relationship between high-concentration portion's lengths (L1) and S storing performance.

As can be understood from FIG. 4 and FIG. 5 in which these results are illustrated, it is preferable that the relationship between the S storage catalyst's overall length "L" and the high-concentration portion 2A's length "L1" can be "L"/15≦"L1"<"L"/3. When the "L1" becomes shorter than "L"/15, the S storing performance lowers because the adsorbing capacity of $SO_2$ and the $SO_3$ conversion capacity get lower. On the other hand, when the "L1" becomes a length of 3/"L" or more, the $SO_3$ adsorbing sites decrease so that the S storing performance lowers because the Ba supporting amount at the low-concentration portion 2B becomes 0 mol/L-cat., even though the adsorbing capacity of $SO_2$ and the $SO_3$ conversion capacity are high.

(Relationship Between Ba Supporting Amount and S Storing Performance)

S-storage-catalyst testing samples were made ready in the same manner as Example No. 1 except the following: they were made to a test-piece size with φ30 mm×L50 mm; and the Ba supporting amount at the high-concentration portion 2A was changed variously to 0.1 mol/L-cat., 0.2 mol/L-cat., 0.3 mol/L-cat., 0.4 mol/L-cat., and 0.5 mol/L-cat.

Here, one in which the Ba supporting amount at the high-concentration portion 2A was set at 0.1 mol/L-cat. is one which corresponds to said Comparative Example. Moreover, in another one in which the Ba supporting amount at the high-concentration portion 2A was set at 0.5 mol/L-cat., the Ba supporting amount at the low-concentration portion 2B is 0 mol/L-cat.

Note that the high-concentration portion 2A's length "L1" was set at 1/5 of the S storage catalyst's overall length "L," and the Ba supporting amount on the entire catalyst was fixed at 0.1 mol/L-cat. Moreover, the Pt supporting amount at the high-concentration portion 2A was fixed at 5.0 g/L-cat., and the Pt supporting amount at the low-concentration portion 2B was fixed at 1.25 g/L-cat.

And, regarding each of the testing samples, the same test as described above was carried out, thereby examining the S storing performance.

Figure 6:
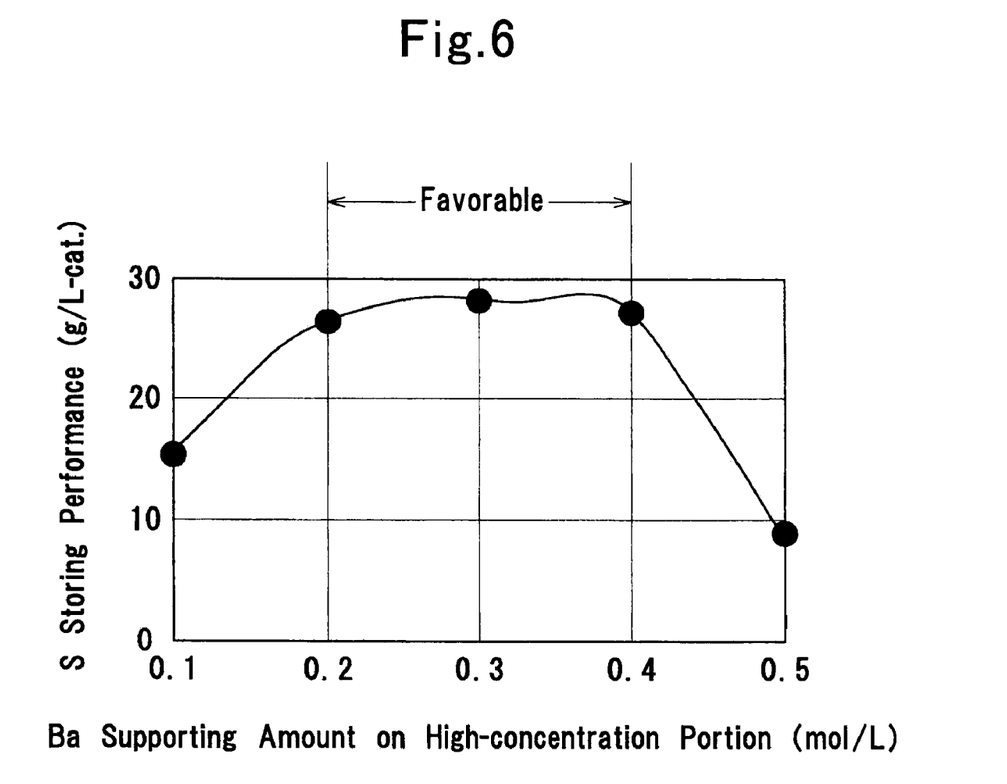
FIG. 6 is a graph for illustrating a relationship between high-concentration portion's Ba supporting amounts and S storing performance.

As can be understood from FIG. 6 in which those results are illustrated, it is preferable that the Ba supporting amount at the high-concentration portion 2A can fall in a range of 0.2-0.4 mol/L-cat. When the Ba supporting amount at the high-concentration portion 2A is less than 0.2 mol/L-cat., the S storing performance lowers because the adsorption amount of $SO_2$ is less. On the other hand, when the Ba supporting amount at the high-concentration portion 2A surpasses 0.4 mol/L-cat., the S storing performance lowers because the Ba supporting amount at the low-concentration portion 2B becomes extremely less.

(Relationship Between Pt Supporting Amount and S Storing Performance)

S-storage-catalyst testing samples were made ready in the same manner as Example No. 1 except the following: they were made to a test-piece size with ϕ30 mm×L50 mm; and the Pt supporting amount at the high-concentration portion 2A was changed variously to 2.0 g/L-cat., 3.5 g/L-cat., 8.0 g/L-cat., and 10.0 g/L-cat.

Here, one in which the Pt supporting amount at the high-concentration portion 2A was set at 2.0 g/L-cat. is one which corresponds to said Comparative Example. Moreover, in another one in which the Pt supporting amount at the high-concentration portion 2A was set at 10.0 g/L-cat., the Pt supporting amount at the low-concentration portion 2B is 0 g/L-cat.

Note that the high-concentration portion 2A's length "L1" was set at ⅕ of the S storage catalyst's overall length "L," and the Pt supporting amount on the entire catalyst was fixed at 2.0 g/L-cat. Moreover, the Ba supporting amount at the high-concentration portion 2A was fixed at 0.3 mol/L-cat., and the Ba supporting amount at the low-concentration portion 2B was fixed at 0.05 mol/L-cat.

And, regarding each of the testing samples, the same test as described above was carried out, thereby examining the S storing performance.

Figure 7:
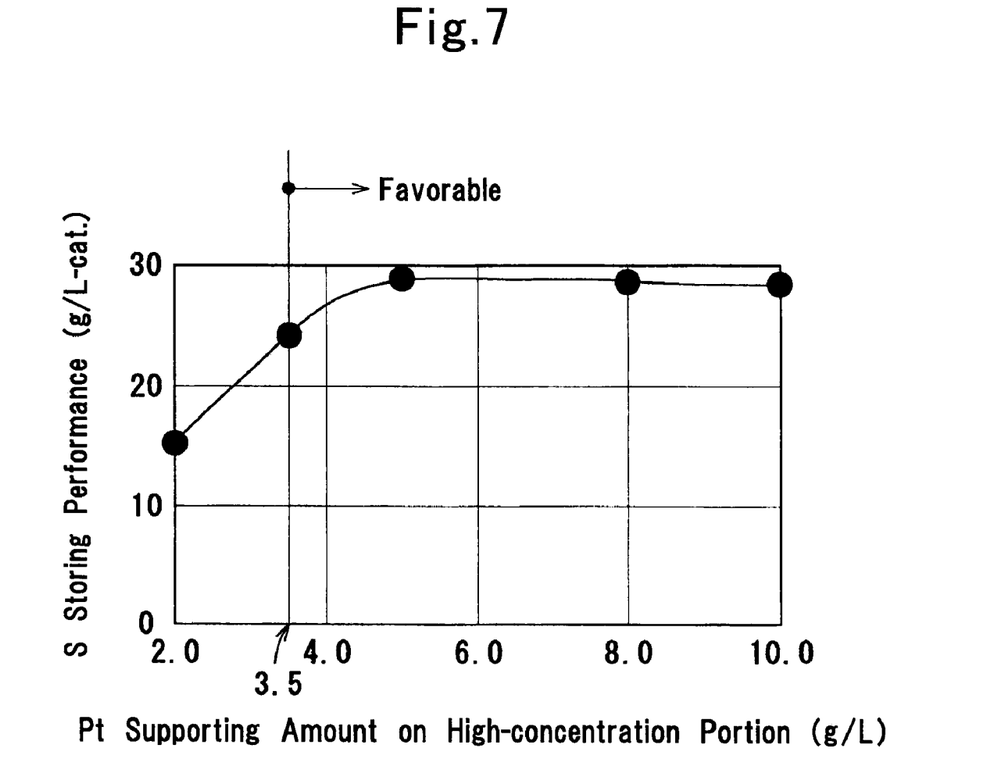
FIG. 7 is a graph for illustrating a relationship between high-concentration portion's Pt supporting amounts and S storing performance.

As can be understood from FIG. 7 in which those results are illustrated, it is preferable that the Pt supporting amount at the high-concentration portion 2A can be 3.5 g/L-cat. or more, it is more preferable that it can be 4.0 g/L-cat. or more, and it is especially preferable that it can be 5.0 g/L-cat. or more. When the Pt supporting amount at the high-concentration portion 2A is less than 3.5 g/L-cat., the S storing performance lowers because the capacity of oxidizing $SO_2$ is low.

The invention claimed is:

1. An S storage catalyst equipped with:
   a catalytic supporter; a catalytic metal being supported on the catalytic supporter and oxidizing $SO_2$ to $SO_3$; and an S storage material being supported on the catalytic supporter and storing S components therein; and wherein:
   an exhaust-gas-inlet-side high-concentration portion in which said S storage material is supported on said catalytic supporter in a high concentration; and an exhaust-gas-outlet-side low-concentration portion in which said S storage material is supported on said catalytic supporter in a low concentration that is lower than that of the high-concentration portion;
   wherein a relationship "L"/15≦"L1"<"L"/3 is satisfied, wherein L is an overall length of the S storage catalyst in an exhaust-gas flowing direction, and wherein L1 is a length of said high-concentration portion in the exhaust-gas flowing direction, and a supporting amount of said S storage material at said high-concentration portion is 0.2-0.4 mol/liter.

2. The S storage catalyst as set forth in claim 1 wherein said catalytic metal is supported on said high-concentration portion in a high concentration; and said catalytic metal is supported on said low-concentration portion in a low concentration that is lower than that of the high-concentration portion.

3. The S storage catalyst as set forth in claim 1, wherein a supporting amount of said catalytic metal at said high-concentration portion is 3.5 g/liter or more.

4. An exhaust-gas converting apparatus equipped with: the S storage catalyst as set forth in claim 1; and an $NO_x$ storage-and-reduction type catalyst being disposed on a more exhaust-gas downstream side than the S storage catalyst is.

* * * * *